United States Patent [19]

Strack

[11] 4,389,089
[45] Jun. 21, 1983

[54] FLEXIBLE FIBER OPTICAL CONDUIT AND METHOD OF MAKING

[75] Inventor: Richard R. Strack, Sturbridge, Mass.

[73] Assignee: Warner Lambert Technologies, Inc., Southbridge, Mass.

[21] Appl. No.: 168,856

[22] Filed: Jul. 14, 1980

[51] Int. Cl.³ .................. G02B 5/17; C03B 23/20; C03B 37/01
[52] U.S. Cl. .................. 350/96.26; 65/3.15; 65/4.21
[58] Field of Search .............. 350/96.24, 96.25, 96.26, 350/96.29, 96.15; 65/3.2, 4.2, 4.21, 3.11, 3.15, 4.3

[56] References Cited

U.S. PATENT DOCUMENTS

| | | | |
|---|---|---|---|
| 3,004,368 | 10/1961 | Hicks, Jr. .................. | 65/4.2 |
| 3,624,816 | 11/1971 | Strack et al. .................. | 350/96.24 |
| 3,653,739 | 4/1972 | Strack .................. | 350/96.15 X |
| 3,669,772 | 6/1972 | Strack .................. | 65/4.21 |
| 4,080,045 | 3/1978 | Nakatsubo et al. .................. | 350/96.24 |

Primary Examiner—Marvin L. Nussbaum
Attorney, Agent, or Firm—Alan H. Spencer

[57] ABSTRACT

A flexible image-conducting bundle of optical fibers is produced by juxtapositioning and drawing a multiplicity of glass-clad glass fiber preforms and interstitial rods of leachable glass. The drawn assembly is cut to desired length and interstitial glasses are leached from the intermediate portion of the cut piece.

8 Claims, 6 Drawing Figures

FLEXIBLE FIBER OPTICAL CONDUIT AND METHOD OF MAKING

BACKGROUND OF THE INVENTION

1. Field of the Invention

This invention relates to the manufacture of flexible image-conducting fiber conduit and has particular reference to improvements in leached optical fiber bundles and method of making same.

2. Description of the Prior Art

Known methods of making leached flexible image-transporting conduit use second claddings of acid-soluble glass on optical fibers or radially-extending fins of acid-soluble glass. U.S. Pat. Nos. 3,624,816 and 3,653,739 are exemplary.

In the case of providing second fiber claddings of leachable glass, the many additional interfaces of the several components needed to make up second claddings and the resulting additional surface areas which become exposed to contamination reduce optical quality of the product, i.e. foreign matter contamination of the various components promotes interfacial gassing and bubble blemishing of critical light-conducting surfaces of the fibers during drawing operations. Also, glasses used in the three-glass fiber fabrication are restricted to combinations having drawing compatibility, i.e. they must have similar temperatures and expansion properties.

In the case of fusing fins of acid-leachable glass to first fiber claddings as in U.S. Pat. No. 3,653,739, considerable tediousness of fiber fabrication, expense and ungainliness of structure is experienced. Accordingly, any advantage of reduced fiber core blemishing can become considerably outweighed by the difficulty and cost of fabrication.

In view of the above, an object of the present invention is to simplify and reduce the cost of manufacturing leached flexible fiber optic conduit.

More particularly, the invention has the objective of overcoming limitations of heretofore lengthy and expensive manufacturing procedures and aims to improve product quality.

Another object is to accomplish the foregoing with greater than usual freedom in the selection of system glasses.

Other objects and advantages of the invention will become more readily apparent from the following description.

SUMMARY OF THE INVENTION

Leached optical fiber conduit is produced according to the invention by juxtapositioning a selected plurality of conventionally clad optical fiber preforms and interstitial rods of acid-soluble glass. The rods are preferably so positioned in the interstices and of such diametral size as to prevent contact of the fiber preforms with one another.

Assembled components are heated and drawn as a unit to the reduced cross-sectional size desired of a final optical fiber conduit and cut to proper length. The cut section is then intermediately leached of interstitial glasses to provide the required conduit flexibility.

The foregoing provides improved fiber bundle blemish quality, simplifies manufacturing procedure and affords unusual freedom for selection of glass compositions and combinations of the system.

Details of the invention will become more readily apparent from the following description when taken in conjunction with the accompanying drawings.

DESCRIPTION OF THE PREFERRED EMBODIMENTS

Flexible optical fiber conduits which have opposite ends of component fibers identically geometrically patterned are used as image-transporting parts of various forms of industrial and medical endoscopes. These devices usually include objective lens means adjacent one end of the fiber optic conduit and eyepieces adjacent the opposite end of the conduit, the former functioning to form images to be transported and the latter functioning to facilitate the viewing of images transported by the conduit.

This invention relates to the manufacture of leached fiber optical conduit per se and, accordingly, its application or adaptability to various forms of endoscopes or other uses will not be discussed in detail. It is well-known, however, that requirements for flexible optical fiber conduit of exceptionally small diameter and fine fiber size can best be met with fiber leaching techniques, the manufacture of large diameter conduit not excepted.

Figure 1:
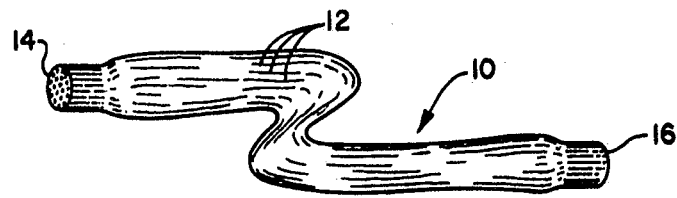
FIG. 1 is an illustration, in perspective, of an embodiment of flexible optical fiber conduit formed according to the present invention.

Leached fiber optic conduit, whether of large or small diameter and large or small fiber size, is illustrated as fiber bundle 10 (FIG. 1). Fibers 12 of bundle 10 are tightly fused together or otherwise similarly joined at opposite ends 14 and 16, either of which may be used as the image-receiving end of the bundle. Portions of fibers 12 between the secured together opposite ends are free to flex individually and independently of one another.

Figure 2:
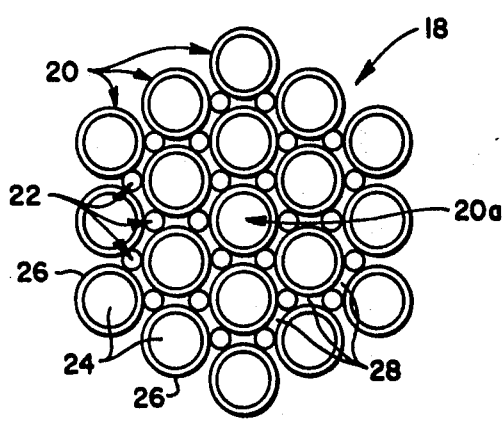
FIG. 2 is an end view of a preform of components used to produce the conduit of FIG. 1.

Fiber bundle 10 is produced from preform 18 (FIG. 2) which comprises an orderly assembly of clad cylindrical elements 20 from which fibers 12 are produced and interstitial spacer rods 22 of acid-soluble material.

Elements 20, having high refractive index cores 24 and relatively low index claddings 26, are arranged concentrically about a central element 20a which provides preform 18 with an overall circular cross-sectional shape. Alternatively, elements 20 may be arranged in successive rows for producing a rectilinear preform 18.

Figure 3:
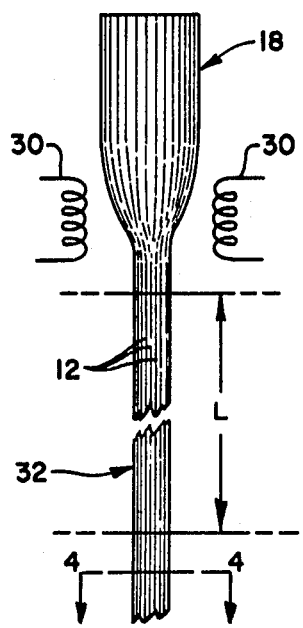
FIG. 3 diagrammatically illustrates drawing and cutting steps of the present procedure.

While elements 20 and acid-soluble rods 22 may be of various cross-sectional sizes, it is presently preferred that rods 22 be of such size and viscosity at fiber drawing temperature as to prevent elements 20 from contacting each other while providing spaces 28 (FIG. 4) for escape of gases during drawing of the preform 18 (FIG. 3).

In the usual fashion of drawing multi-fiber bundles, preform 18 is zonally heated, e.g. with electrical heating coils 30, and pulled longitudinally to a reduced cross-sectional size corresponding to that desired of bundle 10. This may require plural drawing operations or a single-step operation. The drawing technique illustrated in FIG. 3 is applicable to either.

Considering FIG. 3 as representing a final drawing step, the drawn section 32 of preform 18 is cut to desired length L, provided with a coating 34 of wax or other acid-resistant material at each end and immersed in leaching solution 36 (FIG. 5) for removal of interstitial glasses of rods 22.

Figure 4:
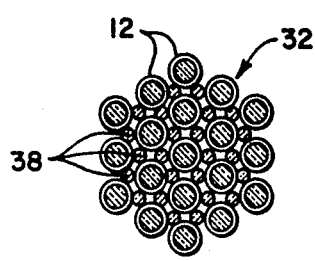
FIG. 4 is a cross-sectional view taken along line 4—4 of FIG. 3.

As illustrated in FIG. 4, fibers 12 formed by the FIG. 3 drawing operation are provided with an interstitial matrix 38 which maintains the initial cross-sectional geometry of preform 18 throughout the drawn section 32. Matrix 38 comprises the heated and drawn material of rods 22.

Figure 5:
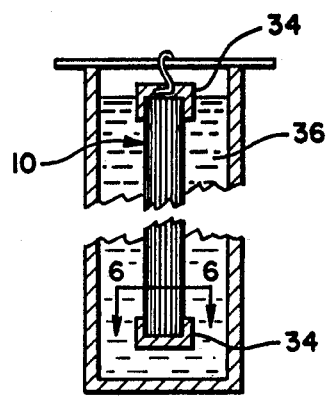
FIG. 5 illustrates a further step of the present manufacturing procedure.
Figure 6:
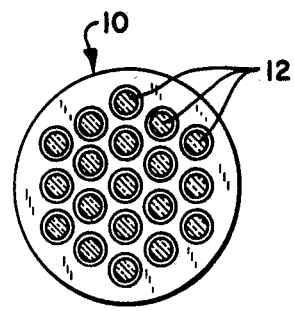
FIG. 6 is a cross-sectional view taken along line 6—6 of FIG. 5.

Leaching as shown in FIGS. 5 and 6 frees fibers 12 for flexing of bundle 10 but with preservation of the geometrical patterning of opposite fiber ends.

These ends of bundle 10 may be compacted if desired, i.e. tightly juxtapositioned by treatment similar to that disclosed in U.S. Pat. No. 3,669,772.

Exemplary of glasses useful in the fabrication of core and cladding components of elements 20 from which fibers 12 are formed are flint and crown respectively. Indices of refraction commonly used for core and cladding are 1.75 and 1.52. It is, of course, well within the skill of the art to select other glasses and combinations of refractive indices. Core and cladding components of elements 20 may be either prefused or merely assembled and unfused in preform 18. In either case, their final fusion takes place during drawing into fibers 12.

Interstitial rod 22 materials may include metals, e.g. aluminum, but are preferably selected from high boron containing acid-soluble glasses. Borosilicate glasses mentioned in U.S. Pat. No. 3,004,368 are appropriate but silica-free acid-soluble glasses are preferred. A desirable composition is approximately 47% (by weight) boron trioxide; 45% (by weight) barium oxide; and 8% (by weight) lanthanum oxide. Suitable leaching solutions 36 for interstitial rod 22 materials are sodium hydroxide for aluminum and hydrochloric acid for the boron glasses. Leaching of the above exemplary composition may be readily accomplished in a solution of approximately 5% (by volume) hydrochloric acid maintained at approximately 65° C. Acid concentration and temperature thereof may be variously adjusted with ordinary skill in the art.

The invention has been described above by way of illustration and not limitation. Various modifications and substitutions may be made to suit particular requirements and it is intended that all modifications based on the above teachings are to be construed as coming within the scope of the following claims or the range of equivalency to which they are entitled.

I claim:
1. The method of making flexible image-conducting fiber conduit comprising:
   constructing a fiber bundle preform by juxtapositioning a plurality of glass-clad glass optical elements and interstitial rods of leachable material, the rods serving to space said elements from each other;
   heating and drawing said preform into a section of approximately the cross-sectional size desired of said conduit, said rods providing an interstitial matrix;
   cutting from said drawn section a length corresponding to the length desired of said conduit;
   covering opposite ends of said cut length of said drawn section; and
   subjecting remaining uncovered portions of said length of drawn section to a leaching medium for a time sufficient to remove said interstitial matrix.
2. The method according to claim 1 wherein said glass-clad glass elements are each comprised of a high-refractive index light-conducting core member and a surrounding relatively low refractive index cladding.
3. The method according to claim 2 wherein said claddings are fused to said core members.
4. The method according to claim 1 wherein said interstitial rods are acid-soluble.
5. The method according to claim 4 wherein said leaching medium is a solution of hydrochloric acid.
6. A flexible image-conducting fiber conduit comprising:
   a multiplicity of juxtapositioned light-conducting fibers having opposite ends similarly geometrically patterned and multiple rod matrix material connecting respective opposite ends of said fibers together, portions of said fibers between said ends being free of said matrix and respectively independently flexible and each rod of said multiple rod matrix material being fused to three adjacent light-conducting fibers at said ends.
7. A flexible image-conducting fiber conduit according to claim 6 wherein said fibers are glass and are individually glass clad.
8. A flexible image-conducting fiber conduit according to claim 7 wherein said multiple rod matrix is an acid-soluble glass fused to said glass-clad glass fibers.

* * * * *